Dec. 25, 1934.　　　J. H. VICTOR　　　1,985,473
GASKET
Filed July 18, 1932　　2 Sheets-Sheet 1
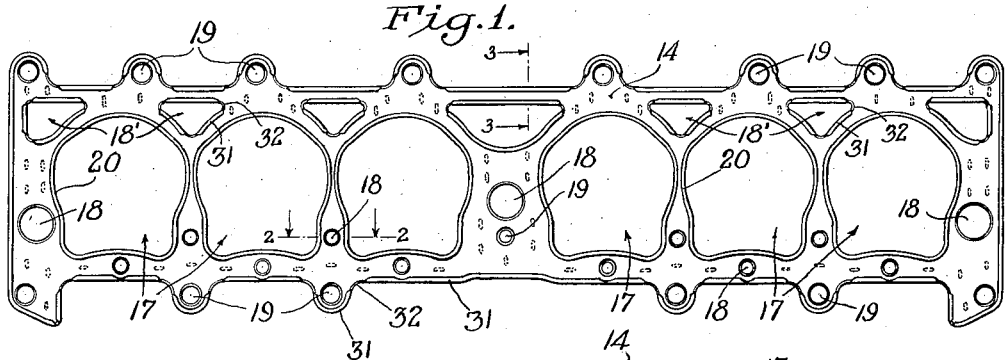
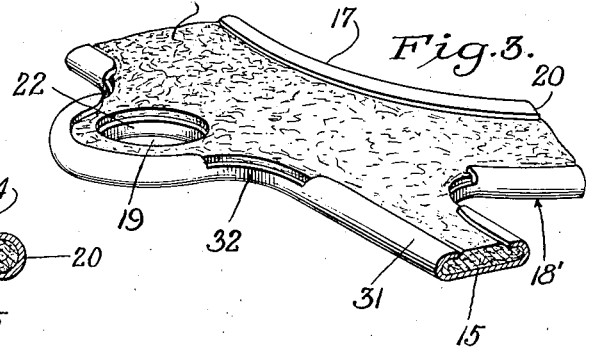
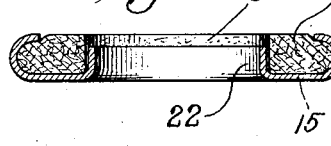
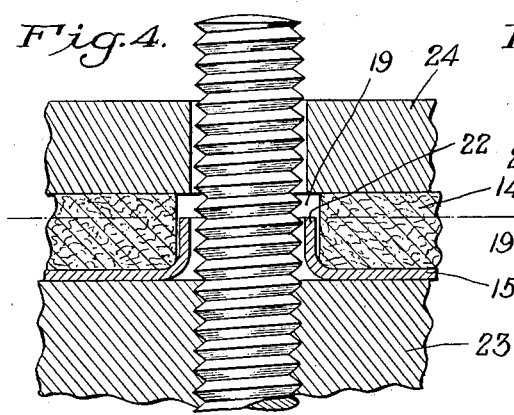
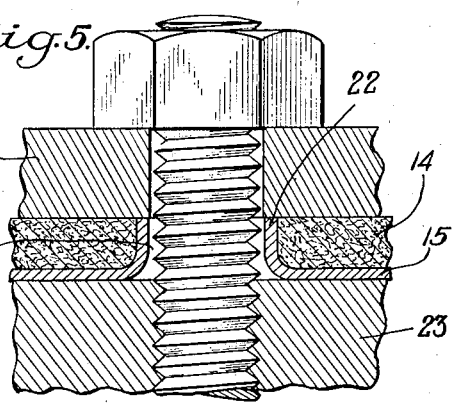
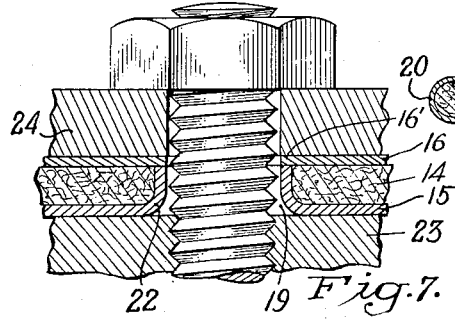
INVENTOR.
John H. Victor
BY
ATTORNEY Dec. 25, 1934.  J. H. VICTOR  1,985,473
GASKET
Filed July 18, 1932   2 Sheets-Sheet 2
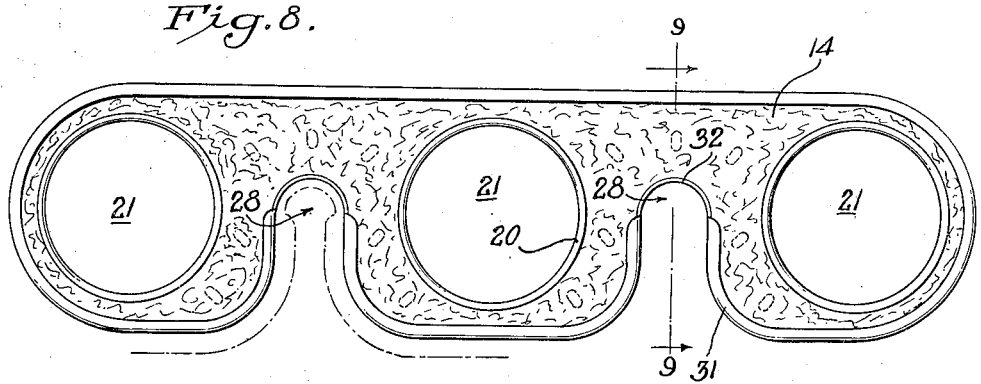
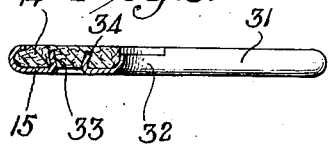
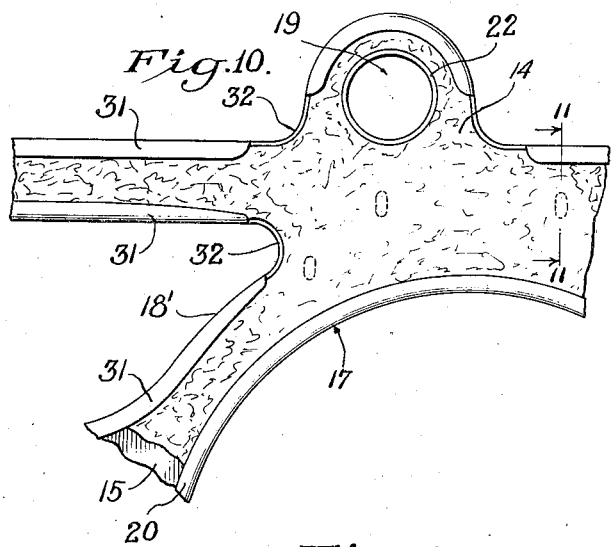
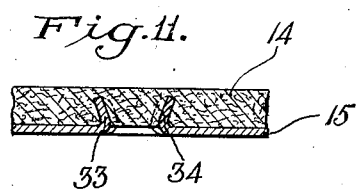
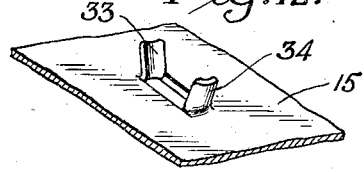
INVENTOR.
John H. Victor
BY Wm. O. Bell
ATTORNEY Patented Dec. 25, 1934

1,985,473

UNITED STATES PATENT OFFICE 1,985,473

GASKET

John H. Victor, Evanston, Ill., assignor to Victor Manufacturing & Gasket Company, Chicago, Ill., a corporation of Illinois Application July 18, 1932, Serial No. 623,044

3 Claims. (Cl. 288—1)

This invention relates to gaskets of the type which are adapted for use in internal combustion engines and the like and are required to resist high temperatures and pressure.

The primary object of the invention is to provide a gasket of simple construction, containing few parts and adapted to be made at low cost, which will have the requisite strength and rigidity to prevent damage in handling, and which will be protected against deterioration from water leakage and will form an effective seal and resist high temperature and pressure.

Another object of the invention is to facilitate installation of the gasket and prevent the edges of the bolt openings from sticking on the threads of the securing bolts and becoming damaged by protecting these edges in a novel manner without impairing compressibility of the gasket.

Another object is to protect the edges of the water openings in a novel manner so that gasket material will not be washed away and without impairing compressibility of the gasket.

Another object is to provide the metal layer with integral flanges for securing the gasket material layer and the metallic layer together and to form these flanges in a novel manner so that they may be provided at sharp corners of short radii without cracking or breaking the metal.

A selected embodiment of the invention is illustrated in the accompanying drawings wherein Fig. 1 is an elevation of a cylinder head gasket;

Fig. 2 is a transverse sectional view taken substantially on the line 2—2 on Fig. 1;

Fig. 3 is a fragmentary perspective view taken substantially on the line 3—3 on Fig. 1;

Fig. 4 is a vertical sectional view showing my novel gasket arranged in position between a cylinder block and cylinder head prior to the clamping of the head in position;

Fig. 5 is a view similar to Fig. 4 showing the parts after the head has been clamped in position;

Fig. 6 is a view similar to Fig. 2 and illustrating another form of gasket;

Fig. 7 is a view similar to Fig. 5 showing the form of gasket illustrated in Fig. 6 clamped in position;

Fig. 8 is an elevational view of a manifold gasket;

Fig. 9 is a sectional detail view taken substantially on the line 9—9 on Fig. 8;

Fig. 10 is a plan view of a fragment of the gasket illustrated in Fig. 3;

Fig. 11 is a sectional detail view taken substantially on the line 11—11 on Fig. 10; and Fig. 12 is a perspective detail view of a fragment of a metallic layer and showing the gasket material retaining prongs formed on the metallic layer.

The primary object of the invention is to provide a gasket of simple and economical construction consisting of a layer 14 of gasket material and a single metallic layer 15 secured together in a novel manner to provide required strength and rigidity and with the marginal edges of the gasket and the edges of the openings therein protected in a novel manner against damage in handling and from water and high temperature and pressure, without impairing the compressibility of the gasket and to insure effective sealing and long continued service.

The metallic layer usually constitutes the bottom of the gasket and in a cylinder head gasket would be applied against the block so that when occasion requires the removal of the head, the gasket may be easily removed from the block without sticking and if the gasket sticks to the head, it can be removed from the head on the bench with a sharp tool and generally without damaging the gasket against repeated use. The gasket may be provided with a top metallic layer 16 as shown in Figs. 6 and 7. The cylinder head gasket illustrated in Fig. 1 has cylinder ports 17, water openings 18 and 18', and bolt openings 19 and the edges of the gasket about the cylinder ports are preferably protected and bound by flanges 20 unitary with the bottom metallic layer 15 to protect the gasket at these edges against high temperature and pressure. In the manifold gasket of Fig. 8, the ports 21 are similarly protected by flanges 20.

In the manufacture of gaskets, the layer material has been punched in the blanking operation to form the corresponding bolt and water openings of uniform size and shape so that when the layers are assembled the edges of the openings will register, but this leaves these edges unprotected and exposed, and it is an important object of my invention to protect these edges so that they will not become damaged. The edges of the bolt openings sometimes stick on the threads of the studs and this not only hinders installation of the gasket but is liable to result in dislodgment of some of the gasket material layer and if the gasket material at the edges of the water openings is not protected it is liable to be washed away by the flow of water and sooner or later the strength of the gasket is damaged and blowouts occur. To overcome these difficulties and to do this in an economical way and effectively and without impairing the compressibility of the gasket, I provide what I term half flanges 22 on the metallic layer 15 about the bolt openings 19 and the water openings 18, and these half flanges extend partly through the openings but terminate below the top of the gasket material layer. Preferably the half flanges extend sufficiently through the openings so that when the gasket is fully clamped in position between the block 23 and the head 24 of an internal combustion engine, the free edges of the half flanges will engage the head, as shown in Figs. 4 and 5; and when the gasket is provided with a top metallic layer 16, the free edge of the half flanges will engage this top layer under clamping pressure, as shown in Fig. 7. For this purpose the opening in the top metallic layer 16 is made smaller than the opening in the gasket material layer to form, in effect, an inwardly projecting annular lip 16' providing the edge of the opening in the top layer, Fig. 6, and the free edge of the flange 22 abuts this lip 16'. In both constructions the half flanges form guides to facilitate applying the gasket to the bolts on a block without damaging the edges of the openings in the gasket and when the gasket is clamped in place, the flanges form a complete protection for the edges of the gasket material at the water openings to prevent the flow of water from washing the gasket material away. The flange 22 extends through the opening in an amount inversely proportionate to the degree of compressibility of the gasket material, the more compressible the material the shorter the flanges. Most gaskets are usually compressed about twenty-five percent and in such gaskets the flange extends through the opening for about three-fourths of the thickness of the gasket.

Wherever a gasket design has included sharp corners of short radii, it has been found difficult to provide flanges on the metallic layer without cracking or breaking the metal and various expedients have been resorted to in efforts to overcome this difficulty but these efforts have usually involved additional parts and operation and have added to the cost of production. I have solved this problem without adding parts or operations and without increasing the cost of production by what I term semi-flanging. The sharp corners may appear in the marginal edges of the gasket, in irregularly shaped water openings, and in some bolt openings, and the edges adjacent said sharp corners are usually either straight or on a sweeping curve. The metal of the layer 15 may be bent to form a flange along the straight or substantially straight or sweepingly curved edges without cracking or breaking and it may be drawn to a limited extent at sharp corners without cracking or breaking the metal but experience shows this cannot be done in commercial production to provide a complete flange at the sharp corners. Therefore I provide the gasket with flanges 31 where this can safely be done without cracking or breaking the metal and at sharp corners I provide half flanges 32 which do not crack or break the metal and answer the purpose, under service conditions, of full flanges for many purposes. At straight edges or substantially straight edges or sweepingly curved edges the flange on the metallic layer overlaps the gasket material layer and secures the layers together, but at sharp corners the flange is upstanding in the form of a half flange, as previously described. The flanges 31 and half flanges 32 are unitary and will contribute sufficient strength to give the gasket desired rigidity and they protect the edges of the gasket material layer in handling and in service. When a semi-flanged gasket is clamped in place between the block and head of an engine, for example, the half flanges 32 thereof will enclose and protect the edges of the gasket material, as previously described.

When a head is removed from the block of an internal combustion engine, the gasket will usually come away with the head because the layer of gasket material will stick to the head and it is desirable that provision be made to enable the gasket to be removed from the head without so damaging the gasket material layer that it cannot be used again. The gasket material is particularly liable to stick to the head where there are large areas of gasket material between securing flanges and to secure the gasket material layer and to prevent the gasket material layer from peeling off or otherwise becoming damaged in removing the gasket from the head to which it has stuck, I provide prongs 33 and 34 on the metallic layer which are embedded in the gasket material. The prongs 33 and 34 are formed by making parallel slits in the metallic layer and the material between the slits is divided substantially medially of its extent. The metal between the slits and on each side of this division is bent upwardly and forms the prongs, and these prongs are inclined in a direction away from each other and are substantially concavo-convex in cross-section which reenforces them and prevents collapsing when the gasket material is applied to the metal layer. The prongs extend through the gasket material substantially to the side thereof opposite that engaging the metallic layer and the anchoring effect of these prongs prevents peeling or other damage to the gasket material upon removal of the gasket from the head.

The invention is not limited to the particular gaskets shown and described and I reserve the right to embody it in other gaskets with such changes in form, construction, and arrangements of parts, as may be necessary to adapt it for different conditions, within the spirit and scope of the following claims:

I claim:

1. In a device which has two opposed clamping members provided with registering ports and openings, and means for securing the members together, the combination therewith of a gasket interposed between said clamping members and having a port and an opening registering with the ports and openings in said members, said gasket comprising a layer of compressible gasket material, a metallic layer on one side of said gasket material layer, a flange binding the edge of the port and adapted to be clamped by said members to provide a tight seal at the port, and an integral upstanding flange on said metallic layer extending into said opening, the free edge of said upstanding flange being opposed to one of said clamping members and terminating below the face of one of said members to permit the gasket material layer to freely compress about the opening and localize the sealing effect at the port, said upstanding flange permitting this free compression of the gasket material about the opening until the free edge of the upstanding flange engages the clamping member opposed thereto and forming a protection for the edge of the gasket material about said opening.

2. In a gasket having an opening therein, a layer of gasket material having a predetermined degree of compressibility, a metallic layer on one side of said layer of gasket material and having a lip projecting beyond the edge of the gasket material about said opening, another metallic layer on the side of the gasket material layer opposite to the first metallic layer, and a flange on said other metallic layer and extending through said opening in an amount inversely proportionate to the degree of compressibility of said gasket material whereby the free edge of said flange will abut said lip when the gasket is compressed in use and forming a protection for the edge of the gasket material about said opening.

3. A gasket including an edge having a sharp bend of short radius and comprising a layer of gasket material and a metallic layer on one side of said gasket material layer, a flange on said metallic layer, parts of the flange adjacent said sharp bend being overlapped on the side of the gasket opposite to said metallic layer and that part of the flange at said sharp bend being foreshortened to avoid cracking or breaking the metal, said foreshortened part of the flange projecting from the metallic layer alongside the gasket material layer at said sharp bend and part way to said opposite side of the gasket to substantially enclose the edge of the gasket material at said sharp bend under compression of the gasket in actual use.

JOHN H. VICTOR.